Feb. 8, 1955 R. L. ERWIN 2,701,538
SEED CHUTE VALVE
Filed Sept. 22, 1950 2 Sheets-Sheet 1
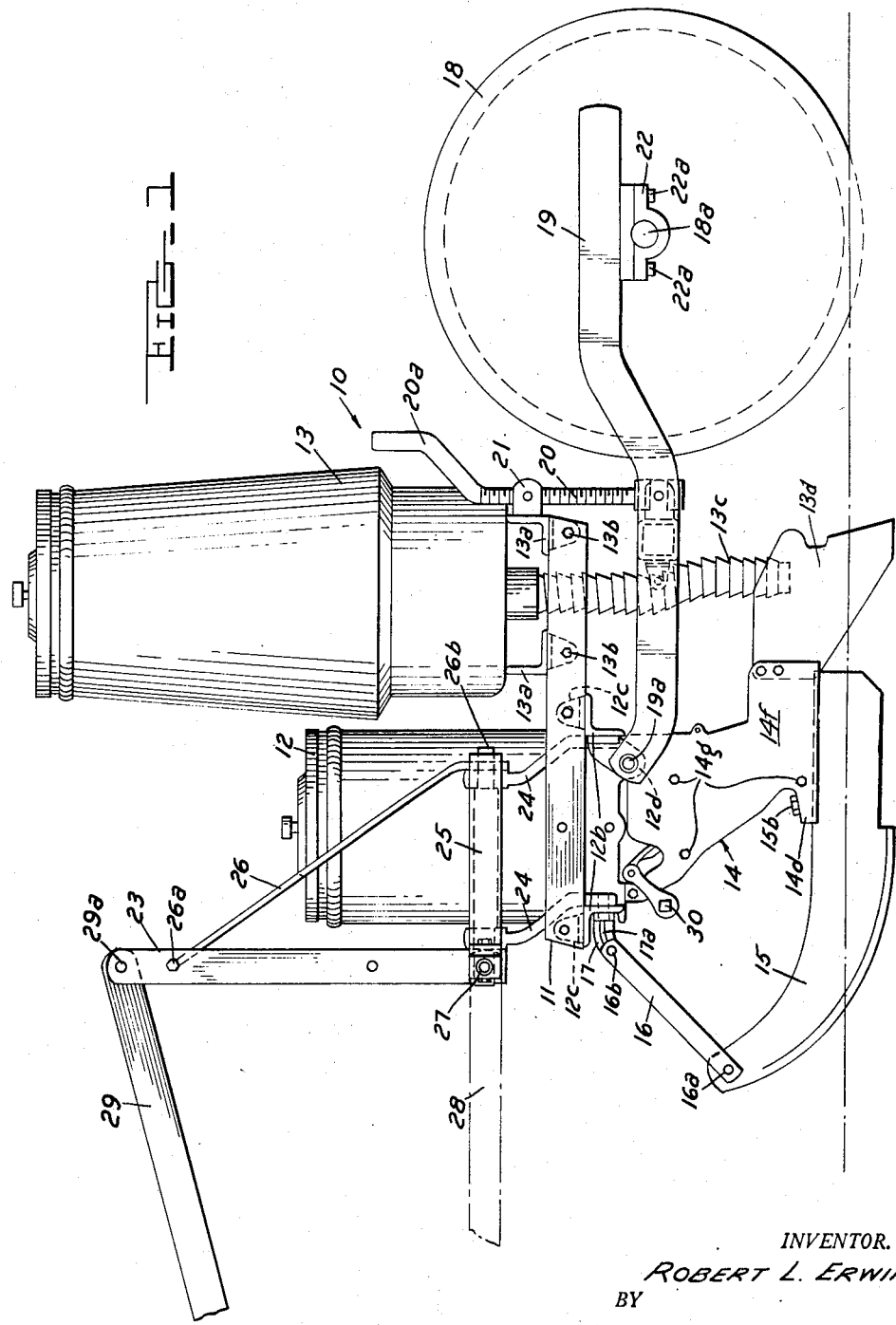
INVENTOR.
ROBERT L. ERWIN
BY
W. A. Schaich
ATTORNEY

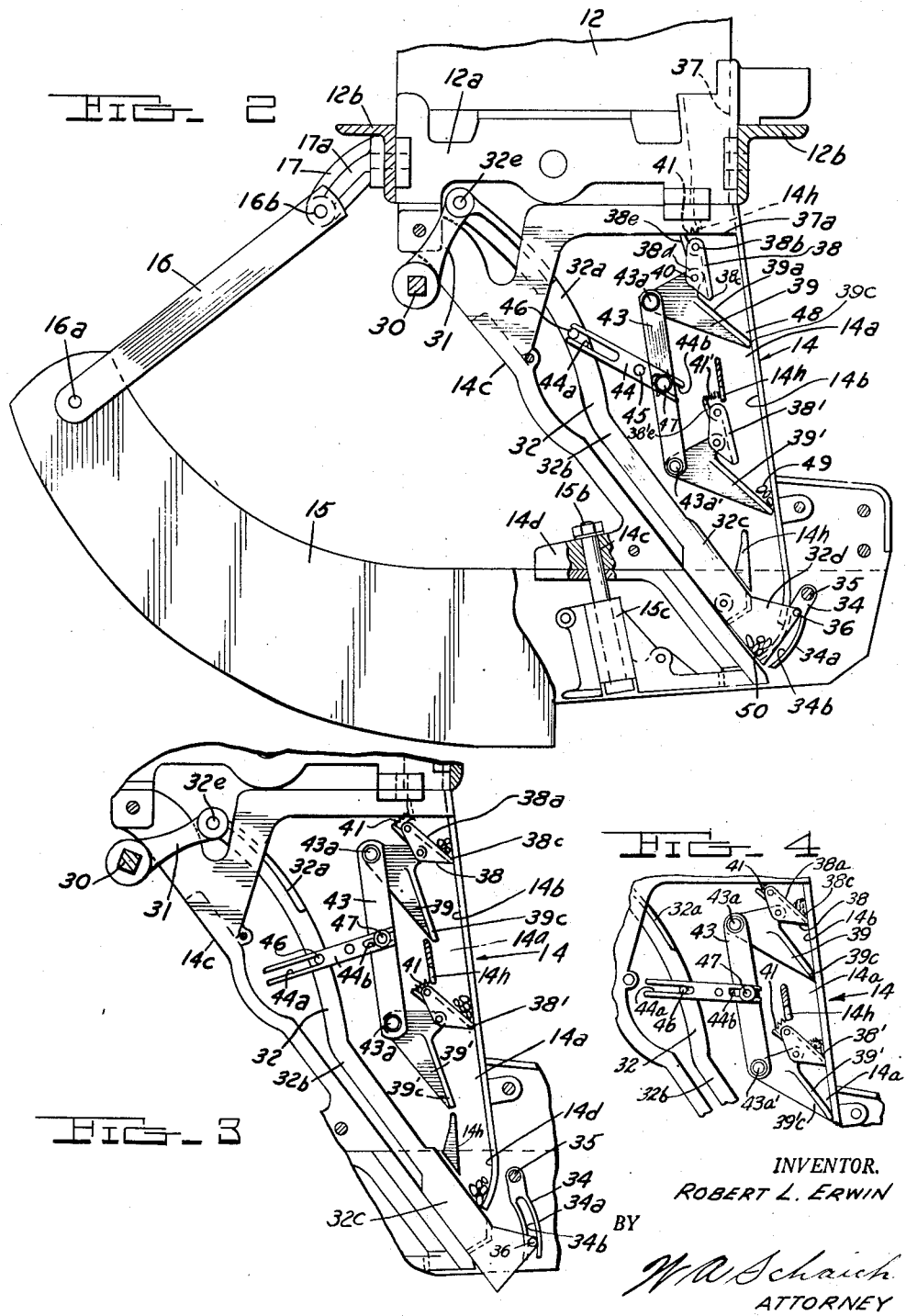

United States Patent Office

2,701,538
Patented Feb. 8, 1955

2,701,538

SEED CHUTE VALVE

Robert L. Erwin, Royal Oak, Mich., assignor, by mesne assignments, to Ford Motor Company, Dearborn, Mich., a corporation of Delaware Application September 22, 1950, Serial No. 186,194

3 Claims. (Cl. 111—51)

This invention relates to a multiple valve system for check row or drill planters for use in high speed planting.

The modern farm tractor permits operation of various implements at speeds far in excess of horse drawn speeds. The tendency, therefore, is to operate existing implements at speeds higher than that for which they have been designed and such is particularly true in the case of planters. For example, check row corn planters operated at horse drawn speeds were entirely satisfactory; however, when such planter is operated at double or triple its intended speed, the time required for the seed to drop from the selecting wheel to the bottom of the seed boot will exceed the time required for the planter to traverse the planting interval. Accordingly, one hill will be missed, the next may receive twice the number of seeds and much irregularity in both the number and spacings of the seed will be encountered.

In order to properly space the seed in the ground at a relatively high rate of travel of the planter, it is necessary to reduce the time interval for dropping the seed by decreasing the height the seed must be dropped. This end may be conveniently accomplished by providing a plurality of vertically spaced valves in the planter boot so that the seed is necessarily dropped from one valve to the next, whereby the time required for the seed to drop from the final valve to the furrow is materially reduced. At the same time, to permit the same planter to be operated at low speeds, suitable precautions must be taken to insure that at no time is the entire seed chute open so that seeds could fall through directly.

Accordingly, it is an object of this invention to provide an improved check row planter capable of accurately planting spaced hills of seed at a high planting rate.

Another object of this invention is to provide an improved multiple valve arrangement for check row or drill planters having a plurality of vertically spaced seed valves operating so that the distance the selected group of seeds has to fall from one valve to the other and from the last valve to the ground is substantially decreased to permit a higher rate of planting.

Another object of this invention is to provide an improved check row planter which will accurately function at both high and low speed planting rates.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a side elevational view of a check row corn planting machine embodying the planter valve of this invention.

Fig. 2 is an enlarged fragmentary view of Fig. 1, shown partly in section, and illustrating the planter valves in their normal position.

Fig. 3 is a view similar to Fig. 2 but showing the planter valves in their other position.

Figure 4 is a fragmentary detail view showing the valves in an intermediate position.

As shown on the drawings:

In Fig. 1 there is shown a check row seed planter 10 comprising briefly a main frame 11 which supports a seed hopper 12 on the forward end thereof. Rearwardly of seed hopper 12, a fertilizer hopper 13 is mounted on top of a pair of transversely spaced angle bars 13a secured respectively to main frame 11 by bolts 13b. A flexible tube 13c projects downwardly from the bottom of fertilizer hopper 13 whereby fertilizer is directed to a fertilizer distributing boot 13d for distribution of such fertilizer into the furrow in which the seed has been planted.

Hopper 12 is mounted on top of a base portion 12a which is supported underneath frame 11 by a pair of transversely spaced angles 12b. Angles 12b are respectively secured to main frame 11 by suitable lugs 12c as shown in Fig. 1. A planter valve housing or boot 14 is secured in depending relationship to the underside of base portion 12a of hopper 12 in suitable manner as shown in Figs. 1 and 2. Housing 14 is provided with a cover 14f which is removably secured to such housing by a plurality of bolts 14g, best shown in Fig. 1. A forwardly disposed lug 14d is provided near the bottom of valve housing 14 on which there is mounted an arcuately shaped furrow opener 15. A bolt 15b is insertable through a suitable hole 15c in the rear end portion of furrow opener 15 and through an aligned hole 14c in lug 14d for securing the opener to lug 14d. The forward end of opener 15 is braced relative to the front end of frame 11 by a bar 16, such bar being secured to plow 15 by a bolt 16a, and the other end of such bar is secured to a downwardly sloping bracket 17 provided on the front end of frame 11. Bracket 17 is provided with a slot 17a and a bolt 16b insertable through a suitable aperture in the upper end of bar 16 cooperates with slot 17a to adjustably secure bar 16b to bracket 17.

A seed packing wheel 18 is rotatably mounted between a pair of transversely spaced arm members 19 as best shown in Fig. 1. The forward ends of arms 19 are respectively secured to a transversely disposed lug 12d provided on the rear edge of base portion 12a of hopper 12 by a bolt 19a. Vertical adjustment of packing wheel 18 is obtained by a screw 20 having a crank end 20a. Screw 20 is vertically supported within a bracket 21 welded to the rearmost angle 13a. Screw 20 cooperates with a vertically threaded hole in a pivoted member (not shown) in bracket 21 while the other end of screw 20 is rotatably secured to arms 19 in any well known manner so that when crank 20a is rotated, screw 20 will be raised or lowered within bracket 21 while raising or lowering arms 19 through the connection of the lower end of such screw to the arms 19. Wheel 18 is mounted on a stub axle 18a which in turn may be rotatably supported in a pair of transversely spaced pillow blocks 22 respectively secured to the underside of arms 19 as shown in Fig. 1 by bolts 22a.

An A-frame 23 is mounted ahead of hopper 12, as shown in Fig. 1, by a pair of brackets 24 secured respectively on each side of frame 11 as shown in Fig. 1. A pair of longitudinal members 25 connect A-frame 23 with such brackets. A rearwardly and downwardly sloping brace 26 is connected at its upper end to a A-frame 26 by a bolt 26a and at its lower end to the rearmost brackets 24 by a bolt 26b. A horizontally disposed mounting pin 27 is mounted on each of the lower ends of A-frame 23 to receive the trailing ends of a pair of vertically swingable, power-lifted draft links 28 provided on a tractor of well known make (not shown). An upper link 29 is also pivotally connected to the top of A-frame 23 by a transverse bolt 29a, such link being part of the so-called three point hitch of the tractor.

The improved planter valve of this invention is preferably operated by a check wire conventionally utilized with check row planters. The check wire (not shown) is engageable with a conventional tripping device mounted on the planter but not shown in this instance, which intermittently oscillates a square shaft 30 at a rate proportional to the ground speed of the planter. Shaft 30 is disposed transversely of the planter underneath the upper forward edge of housing 14 as best shown in Figs. 2 and 3. Housing 14 is of substantially triangular configuration having a rearwardly disposed side which joins the base portion 12a of hopper 12 at substantially right angles. A crank arm 31 is nonrotatably mounted on shaft 30 as shown in Fig. 2 and such crank arm projects into housing 14 through a suitable aperture.

A valve actuating member 32 is pivotally connected to crank arm 31 for actuation of the planter valves as will be later described. Valve actuating member 32 has an arcuately shaped upper portion 32a, the top end of which is pivotally connected to the end of crank arm 31 as by a transverse pin 32e. The lower portion 32b of valve actuating member 32 is straight as shown in Figs. 2 and 3 and lies substantially parallel to the forwardly facing side 14c of housing 14. The straight portion 32b terminates in an enlarged solid portion 32c which is slidingly restrained between the inner face of wall 14c of housing 14 and the bottom end of an interior wall 14h of housing 14.

Adjacent the rear interior edge of hopper 12 there is provided a vertically disposed passageway 37 which projects through base portion 12a and communicates with the interior of housing 14 as shown at 37a.

Immediately below the passageway 37 a seed chute 14a is defined within housing or boot 14, adjacent to the rear wall 14b of such housing. An integral transverse wall 14h is cast into housing 14 and the seed chute 14a is defined between such wall and the internal surface of the rear wall 14b. The wall 14h is, however, apertured near both its top and bottom portions to respectively mount a set of top valves 38 and 39 and a set of intermediate valves 38' and 39', and to permit such valves to swing into and out of the seed chute 14a between open and closed positions relative to such seed chute. The intermediate set of valves 38' and 39' are constructed and mounted identically to the top set of valves 38 and 39, so that description of one set of the valves will suffice for both.

Valve 38 is of generally triangular configuration and is pivotally mounted to housing 14 by a pin 38b located near one of the vertex portions of such valve. One face 38a of the valve 38 is so constructed as to fit snugly between the walls of the seed chute 14a and to close such seed chute when the valve 38 is pivoted to the position illustrated in Fig. 3 wherein another vertex 38c of the valve is in abutting relationship to the front wall 14b of the seed chute. The third vertex portion 38d is bifurcated to receive and pivotally mount a vertex portion of the generally triangularly shaped valve 39. A pin 40 effects the pivotal mounting of valve 39 on valve 38. Valve 39 has a face 39a which fits snugly between the vertical walls of seed chute 14a and is movable to a closed position relative to seed chute where another vertex portion 39c of the valve contacts the front wall 14b. A spring 41 is provided to maintain a constant bias on valve 38 urging such valve to its closed position. Spring 41 may, for example, be mounted between the housing wall 14h and a spring seat projection 38e formed on valve 38. Valve elements 38' and 39' are related the same as valve elements 38 and 39. Actuation movement is imparted to both the valves 38 and 39 and 38' and 39' by a link 43 which is pivotally connected between the third vertex portions of the valves 39 and 39' as by pins 43a and 43a'.

The ends of link 43 are respectively pivotally connected by transverse pins 43a to the forwardly facing vertex portions of valves 39 and 39'. Link 43 is moved by a rocker member 44 pivotally mounted to housing 14 by a transverse pin 45. Each end of rocker member 44 is bifurcated as shown at 44a and 44b. The bifurcated end 44a surrounds a tranversely disposed stud 46 provided on the arcuate portion 32a of valve actuating member 32. The bifurcated end 44b of rocker member 44 surrounds a transverse pin 47 secured centrally of link member 43. Both sets of valves are so arranged that one valve of the set arrives at its closed position before the other valve of the set opens. Hence at no time is the entire seed chute open to permit a seed to drop directly through. This action will be clarified in the following discussion of operation.

The lowermost end of the actuating member 32 is bifurcated and thus in the normal position of actuating member 32, provides a vertical passageway or slot 32d aligned with the seed chute 14a. The slot 32d is normally closed by a valve 34 which is pivotally mounted on housing 14 by a transverse pin 35. Valve 34 fits snugly within the bifurcated portion of actuating member 32 so that when it is in its closed position, seeds will be trapped within the slot 32d. Valve 34 is shiftable to an open position by the downward stroke of actuating member 32 by the provision of a transverse pin 36 in the end of actuating member 32 which engages an elongated slot 34b in valve 34. In this manner, the valve 34 is pivoted between the closed position illustrated in Fig. 2 and the open position illustrated in Fig. 3. In the open position of valve 34 the solid portion 32c of the actuating member 32 is brought into alignment with the seed chute 14a and serves to trap any seeds which drop through the seed chute between such slotted portion 32d and the incurved bottom end 14d of the front wall 14b. Hence, the actuating member 32 also insures that at no time is the entire length of the seed chute 14a open for free vertical fall of seeds.

*Operation*

The planter 10 shown in Fig. 1 is mounted on the trailing draft links 28 of the tractor and the top link 29 as previously described. Thus the planter may be readily transported in a raised position to the field to be planted. Upon lowering the planter to working position in the usual manner by lowering links 28 and 29 the furrow opener 15 will engage the soil. The check wire (not shown) is attached to the tripping device (not shown) connected to the transverse shaft 30. Seed hopper 12 and fertilizer hopper 13 respectively contain conventional power driven seed plates and fertilizer agitators and flow metering devices (all not shown) for discharging the seed and fertilizer in the desired amounts and in timed relation to the ground speed. As these elements are of well known construction, no further description thereof is believed necessary, as such forms no part of this invention. The seed selected by the seed plates (not shown) drop through the passageway 37 from hopper 12 and its downward passage is controlled by upper valves 39 and 38, intermediate valves 38' and 39', and bottom valve 34, as will be later described. The furrow opener 15 parts the soil so that the seed deposited from hopper 12 through the valve housing 14 will be placed in the ground at the required depth. The fertilizer boot trailing behind the valve housing 14 opens a furrow sufficiently wide to receive the fertilizer deposited through flexible tube 13c. Packing wheel 18 covers such furrows and packs the soil on top of the seed.

Shaft 30 is rotated in a clockwise direction from the position shown in Fig. 2 when the check row trip wire engages the tripping device (not shown). Crank 31 will then be rotated in a clockwise direction to move valve actuating member 32. The upper portion 32a of valve actuating member 32 is moved downwardly as crank arm 31 is rotated to the position shown in Fig. 3. Prior to movement of crank arm 31, a selected number of seeds 48 have been deposited on face 39a of valve 39 by the seed selecting mechanism, assuming that valves 39 are in their closed position as shown in Fig. 2, that is, the ends of valves 39 and 39' contact the rear wall of housing 13. Valve 34 will also then lie in a closed position.

Crank arm 31 moves valve actuating member 32 downwardly which rotates rocking member 44 in a counterclockwise direction thereby raising link 43. Since the spring 41 maintains constant bias tending to move the interconnected valves 38 and 39 in a counterclockwise direction, and since the valve 39 in its closed position is restrained against any substantial movement about the pivotal mounting 38b of valve 38 by virtue of the engagement of the nose 39c of the valve with the wall of seed chute 14a, the counterclockwise rotation of rocking member 44 permits link 43 to shift both upwardly and laterally to the right as viewed in Fig. 3, and hence permits spring 41 to rotate valve 38 to its closed position wherein the outer tip 38c of the valve is in engagement with the wall of housing 14. Immediately such engagement occurs, further movement of the rocking member 44 results in imparting a clockwise rotation to the valve 39 about its pivotal mounting 40 and a shifting of the valve 39 from its closed position, so that valves 38 and 39 assume the positions shown in Fig. 3 at the end of the clockwise stroke of crank arm 31.

The same action takes place between valves 38' and 39'. Accordingly it is clear that neither valves 39 or 39' move to their open position until after their associated valves 38 and 38' have respectively moved to their closed position.

On the return counterclockwise stroke of crank arm 31, which imparts an upward movement to valve actuating member 32, Figure 4, the closed valve 38 is restrained against any movement by virtue of its engagement with the wall of housing 14 until the open valve 39 has pivoted counterclockwise sufficiently to bring its outer nose 39c into engagement with the wall of the seed chute 14a, thereupon the valve 38 is pivoted in a clockwise direction about its pivotal mounting 38b and returned to the position shown in Fig. 2. Here again, the action of intermediate valves 38' and 39' is identical to that described for valves 38 and 39. Again, the closed valve of the set does not open until the open valve of the set has moved to its closed position.

Concurrently, the actuating member 32 produces a rocking of the bottom valve 34 between its open and closed position, the downward stroke of actuating member 32 shifting valve 34 to its open position, and the upward stroke of actuating member 32 shifting valve 34 to its closed position. As valve 34 is open, the solid end portion 32c of actuating member 32 moves into vertical alignment with the incurved bottom wall portion 14d of the seed chute 14a and hence functions as a valve to close the bottom of the seed chute and trap any seeds dropping from the intermediate valve 39' until valve 34 is returned to its closed position, whereupon the trapped seeds are dropped on to valve 34.

Summarizing, it is apparent that the seeds are dropped from the seed can 12 into the ground furrow in six successive stages. Between actuations of the rocker arm 31 by the check wire, the pre-selected quantities of seeds are retained on top of valves 39, 39' and 34 respectively. During the actuation of the rocker arm 31 by the check wire, a two step valve action occurs. In the first step, the seeds held by the bottom valve 34 are dropped into the furrow, the seeds held by intermediate valve 39' are dropped on top of the solid end portion 32c of the actuating member 32, the seeds retained by top valve 39 are dropped on to intermediate valve 38', and the next group of seeds dropped from the seed can 12 are deposited on the top valve 38. In the second valving step, corresponding to the return of rocker arm 31 to its normal position, the seeds held by the solid portion 32c of actuating member 32 are dropped onto bottom valve 34, the seeds held by the intermediate valve 38' are dropped on to intermediate valve 39', and the seeds held by top valve 38 are dropped on to top valve 39.

From the above description it is clear that there is here provided an improved multi-step planter valve arrangement which greatly reduces the fall of the seed between steps, thereby reducing the time interval required for the seed to drop from station to station and thence for deposition in the seed furrow. Thus the planter may be operated at an appreciably greater speed while maintaining the desired spacing of the seed in the ground. It is further pointed out that the operation of this valve is relatively simple and the parts making up this assembly are few in number thereby greatly reducing the maintenance of this planter.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a planter seed boot having substantially vertically disposed walls defining a seed dropping chute, a first valve of generally triangular configuration having one vertex portion pivotally mounted in said boot adjacent said seed chute and another vertex portion swingable between open and closed positions relative to said seed chute, a second valve of generally triangular configuration, means pivotally connecting one vertex portion of said second valve to the third vertex portion of said first valve, so another vertex portion of said second valve can swing into closed position relative to said seed chute irrespective of the position of said first valve, resilient means urging said first valve toward closed position, an operator member pivotally connected to the third vertex portion of said second valve, and means for moving said operator member between two positions, in the first of said positions said first valve being held in said closed position by said resilient means and said second valve being held open, and in the second of said positions said second valve being held closed and said first valve being held open.

2. In a planter seed boot having substantially vertically disposed walls defining a seed dropping chute, a first valve of generally triangular configuration having one vertex portion pivotally mounted in said boot adjacent said seed chute and a second vertex portion swingable between open and closed positions relative to said seed chute, and a third vertex portion disposed intermediate said first and second vertex portions, a second valve of generally triangular configuration having one vertex portion intermediate second and third vertex portions, means pivotally connecting said one vertex portion of said second valve to said third vertex portion of said first valve, so said second vertex portion of said second valve can swing into closed position relative to said seed chute irrespective of the position of said first valve, resilient means urging said first valve toward closed position, an operator member pivotally connected to the third vertex portion of said second valve, and means for moving said operator between two positions, in the first of said positions said first valve being held in said closed position by said resilient means and said second valve being held open, and in the second of said positions said second valve being held closed and first valve being held open.

3. In a seed planter having a seed hopper adapted for discharging groups of seed and provided with a seed discharge opening, a valve housing depending from the planter and aligned with the seed discharge opening and defining a substantially vertical seed chute, a valve actuating member longitudinally movably mounted in the housing including a valve portion on the bottom end thereof movable between open and closed positions relative to said seed chute, means for longitudinally moving said valve actuating member, two sets of valves having corresponding elements capable of parallel movement, said valve sets being vertically spaced in the housing, each set of valves comprising a first element and a second element, said first elements being pivoted to the housing, spring means urging said first elements to closed position relative to said seed chute, means pivoting said second elements to said first elements, linkage means connecting said second elements for parallel movement of said second elements, lever means connecting said valve actuating member with said linkage means, said valve sets being operable by said valve actuating member to alternately retain seed on said first elements in one position of said linkage means and on said second elements in another position of said linkage means, said valve portion of said valve actuating member being longitudinally moved to an open position relative to said seed chute in timed sequence to movements of said valve sets to thereby discharge seed from said valve housing.

References Cited in the file of this patent

UNITED STATES PATENTS

| | | |
|---|---|---|
| 645,683 | Graham | Mar. 20, 1900 |
| 664,264 | Graham | Dec. 18, 1900 |
| 708,137 | Graham | Sept. 2, 1902 |
| 811,544 | Englund | Feb. 6, 1906 |
| 1,108,131 | Cantrell | Aug. 25, 1914 |
| 1,215,628 | Dooley | Feb. 13, 1917 |
| 1,216,788 | Englund | Feb. 20, 1917 |
| 1,306,153 | Krotz | June 10, 1919 |
| 1,951,458 | White | Mar. 20, 1934 |
| 2,390,969 | Traphagen | Dec. 11, 1945 |